(12) United States Patent
Katagiri et al.

(10) Patent No.: US 11,307,611 B2
(45) Date of Patent: Apr. 19, 2022

(54) REFLECTIVE DISPLAY BODY

(71) Applicant: LINTEC CORPORATION, Tokyo (JP)

(72) Inventors: Baku Katagiri, Tokyo (JP); Kentaro Kusama, Tokyo (JP); Tatsuki Kuramoto, Tokyo (JP)

(73) Assignee: LINTEC CORPORATION, Tokyo (JP)

(*) Notice: Subject to any disclaimer, the term of this patent is extended or adjusted under 35 U.S.C. 154(b) by 0 days.

(21) Appl. No.: 17/111,699

(22) Filed: Dec. 4, 2020

(65) Prior Publication Data
US 2021/0173435 A1 Jun. 10, 2021

(30) Foreign Application Priority Data
Dec. 6, 2019 (JP) .............................. JP2019-221458

(51) Int. Cl.
*G02F 1/03* (2006.01)
*G06F 1/16* (2006.01)
*G02B 5/02* (2006.01)

(52) U.S. Cl.
CPC ......... *G06F 1/1609* (2013.01); *G02B 5/0263* (2013.01); *G02B 5/0289* (2013.01)

(58) Field of Classification Search
CPC .... G06F 1/1609; G02B 5/0263; G02B 5/0289

USPC ......................................................... 359/242
See application file for complete search history.

(56) References Cited

U.S. PATENT DOCUMENTS
2016/0077246 A1  3/2016 Kusama et al.

FOREIGN PATENT DOCUMENTS
JP          6250648          12/2017

*Primary Examiner* — William Choi
(74) *Attorney, Agent, or Firm* — Greenblum & Bernstein, P.L.C.

(57) ABSTRACT

A reflective display body includes a light diffusion control layer and a reflective layer. The light diffusion control layer has a plurality of regions having a relatively high refractive index in a region having a relatively low refractive index. The regions having the relatively high refractive index extend from one surface side toward the other surface side of the light diffusion control layer, and a straight line parallel to the extending direction is tilted with respect to the thickness direction of the light diffusion control layer. When a vector C is obtained by projecting a vector, which is parallel to the extending direction and directed from the surface side distal to the display surface of the reflective display body toward the display surface side, onto the display surface, the smallest angle among three angles between vector C and vectors D1 to D3 is more than 0° and 45° or less.

8 Claims, 3 Drawing Sheets

(a)          (b)          (c)

REFLECTIVE DISPLAY BODY

TECHNICAL FIELD

The present invention relates to a reflective display body including a light diffusion control layer that can transmit and diffuse the incident light within a predetermined incident angle range in a strong and low light loss state.

BACKGROUND ART

Display bodies such as liquid crystal display devices, organic electroluminescence (EL) displays, and electronic paper include those classified into reflective display bodies including reflective layers. In such reflective display bodies, the display surface of a reflective display body is generally illuminated by a light source such as an indoor light or the sun and/or a light source provided on the display surface side of the display body, and light from these light sources is reflected by the reflective layer into reflected light, which enables good visibility of the display.

When using the reflective display body, the positional relationship between the light source and the viewer is usually not fixed due to the use of an external light source. This may result in a problems in that, depending on the position of the light source, insufficient light reaches the viewer to deteriorate the visibility and the entire display body cannot be illuminated brightly. To solve such a problem, it is conceivable to incorporate a light diffusion plate into the display body. However, simply incorporating a general light diffusion plate may lead to another problem in that the diffusivity necessary for good visibility cannot be sufficiently obtained and, if attempting to achieve high diffusion, light loss due to stray light or backscattering occurs to impair the image clarity. From the viewpoint of solving these problems, in the reflective display bodies, it is considered that a light diffusion control layer that can transmit and diffuse the incident light within a predetermined incident angle range in a strong and low light loss state is provided between the surface on the viewer side and the reflective layer (Patent Document 1, for example). The existence of the above light diffusion control layer allows the light reflected from the reflective layer to be moderately diffused, and the deterioration in the visibility depending on the position of the light source can thus be reduced.

PRIOR ART DOCUMENTS

Patent Documents

[Patent Document 1] JP6250648B

SUMMARY OF THE INVENTION

Problems to be Solved by the Invention

Many smartphones and tablets in recent years have a function of switching the up-down direction of display content in accordance with the vertical posture of the display surface. That is, when the short sides of the display surface are parallel to the ground, the display content is displayed such that the up-down direction of the display content is parallel to the long sides of the display surface, while when the long sides of the display surface are parallel to the ground, the display content is displayed such that the up-down direction of the display content is parallel to the short sides of the display surface.

In such a reflective display body configured such that the up-down direction of display content on the display surface can be changed, when the up-down direction of the display content is changed, the effect of the above-described light diffusion control layer on the improvement of visibility cannot be sufficiently obtained, which may be problematic. For example, even when good visibility is obtained in the case of displaying the display content such that the up-down direction of the display content is parallel to the long sides of the display surface, if the long sides of the display surface are set parallel to the ground to display the display content such that the up-down direction of the display content is parallel to the short sides of the display surface, the light diffusion control layer cannot sufficiently exhibit the above effect, and satisfactory visibility is not obtained, which may also be problematic.

The present invention has been made in consideration of such actual circumstances and an object of the present invention is to provide a reflective display body that exhibits excellent visibility even when the up-down direction of the display content is changed.

Means for Solving the Problems

To achieve the above object, first, the present invention provides a reflective display body configured such that an up-down direction of display content on a display surface can be changed, the reflective display body comprising: a light diffusion control layer having a regular internal structure, the regular internal structure comprising a plurality of regions having a relatively high refractive index in a region having a relatively low refractive index; and a reflective layer provided on a surface side of the light diffusion control layer opposite to the display surface, wherein in the light diffusion control layer, the regions having the relatively high refractive index extend from one surface side toward another surface side of the light diffusion control layer, and a straight line parallel to an extending direction of the regions is tilted with respect to a thickness direction of the light diffusion control layer, wherein when vectors A, C, D1, D2, and D3 are defined as follows: the vector A is parallel to the extending direction and directed from a surface side of the reflective display body distal to the display surface toward the display surface side; the vector C is obtained by projecting the vector A onto the display surface; the vector D1 has a starting point on a center of the display surface and is in a downward direction of an initial up-down direction of the display content; the vector D2 has a starting point on the center of the display surface and is in a leftward direction of an initial right-left direction of the display content; and the vector D3 has a starting point on the center of the display surface and is in a rightward direction of the initial right-left direction of the display content, a smallest angle among an angle between the vector C and the vector D1, an angle between the vector C and the vector D2, and an angle between the vector C and the vector D3 is more than 0° and 45° or less (Invention 1).

The reflective display body according to the present invention (Invention 1) is configured such that the light diffusion control layer satisfies the above condition of an angle, and can thereby effectively exhibit the effect even when the up-down direction of the display content is changed, and as a result, excellent visibility can be achieved.

In the above invention (Invention 1), when a vector B is defined as a vector that is parallel to the thickness direction of the light diffusion control layer and directed from the surface side of the reflective display body distal to the display surface toward the display surface side, an angle between the vector A and the vector B may be preferably more than 0° and 30° or less (Invention 2).

In the above invention (Invention 1, 2), the display surface may preferably have a rectangular shape, and the reflective display body is configured such that the initial up-down direction of the display content is parallel to any one of sides of the rectangular shape (Invention 3).

In the above invention (Inventions 1 to 3), the reflective display body comprises a front light provided on a surface side of the light diffusion control layer opposite to the reflective layer, the front light comprises: a light guiding member that covers the display surface; and a light source that is in contact with the light guiding member and positioned on at least a part of a peripheral part of the display surface, and the light source is present at a position at which, when the display surface is viewed in a plane, a straight line passing through a center of the light source and the center of the display surface is not parallel to any of the up-down direction and the right-left direction of the display content (Invention 4).

Advantageous Effect of the Invention

The reflective display body according to the present invention exhibits excellent visibility even when the up-down direction of the display content is changed.

EMBODIMENTS FOR CARRYING OUT THE INVENTION

Hereinafter, one or more embodiments of the present invention will be described.

Figure 1:
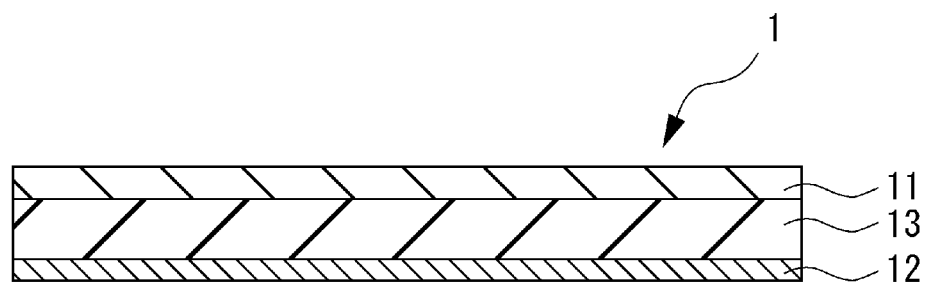
FIG. 1 is a cross-sectional view of an example of a reflective display body according to an embodiment of the present invention.

FIG. 1 illustrates a cross-sectional view of an example of a reflective display body 1 according to an embodiment of the present invention. The reflective display body 1 according to the present embodiment is configured such that the up-down direction of display content on the display surface can be changed.

As illustrated in FIG. 1, the reflective display body 1 may include a light diffusion control layer 11, a display device 13 provided on one surface side of the light diffusion control layer 11, and a reflective layer 12 provided on a surface side of the display device 13 opposite to the light diffusion control layer 11.

Figure 2:
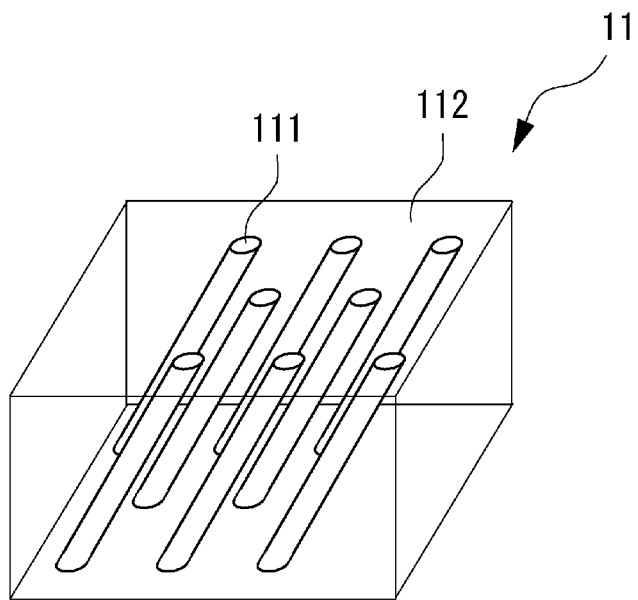
FIG. 2 is a perspective view schematically illustrating an example of a regular internal structure (column structure) of a light diffusion control layer in an embodiment of the present invention.

In the reflective display body 1 according to the present embodiment, the light diffusion control layer 11 may have a regular internal structure that includes a plurality of regions having a relatively high refractive index in a region having a relatively low refractive index. In the perspective view of FIG. 2, a column structure (details will be described later) is schematically illustrated as an example of such a regular structure. As illustrated in FIG. 2, the light diffusion control layer 11 may have a structure in which regions 111 (columnar bodies) having a relatively high refractive index extend in the thickness direction of the light diffusion control layer 11, and the surroundings of the regions 111 are filled with a region 112 having a relatively low refractive index. Here, the regular internal structure refers to an internal structure configured such that the plurality of regions 111 having a relatively high refractive index is arranged with a predetermined regularity in the region 112 having a relatively low refractive index (for example, an internal structure configured such that, when viewing a cross section obtained by cutting the light diffusion control layer 11 along a plane parallel to the surface of the light diffusion control layer 11, that is, a cross section obtained by cutting the light diffusion control layer 11 at a position at which the above regular internal structure exists, the regions 111 having a relatively high refractive index are repeatedly arranged at a similar pitch along at least one direction in the above cross section in the region 112 having a relatively low index). Thus, the regular internal structure as referred to herein has a feature that the regions 111 having a relatively high refractive index extend in the film thickness direction, and this feature is distinguished from those of a phase-separation structure in which one phases exist in the other phase without clear regularity and a sea-island structure in which approximately spherical island components exist in a sea component.

Figure 3:
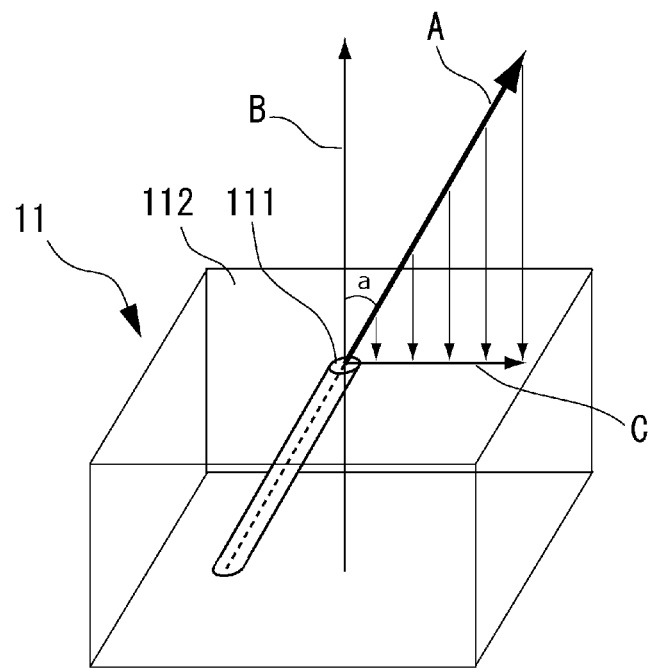
FIG. 3 is a perspective view for describing some directions (vectors) related to the light diffusion control layer in an embodiment of the present invention.

Regarding the internal structure of the light diffusion control layer 11, the regions 111 having a relatively high refractive index extend from one surface side toward the other surface side of the light diffusion control layer 11, and a straight line parallel to the extending direction of the regions 111 is tilted with respect to the thickness direction of the light diffusion control layer 11. This will be described in detail with reference to FIG. 3. The perspective view of FIG. 3 is drawn, for descriptive purposes, by leaving only one of the plurality of regions 111 having a relatively high refractive index, which exist originally in the light diffusion control layer 11, and omitting the other regions 111. In FIG. 3, the regions 111 having a relatively high refractive index extend from one surface side toward the other surface side of the light diffusion control layer 11 (in particular, from the surface side of the reflective display body 1 distal to the display surface toward the display surface side; in FIG. 3, from the lower side toward the upper side), and the straight line parallel to the extending direction (direction A) of the regions 111 is tilted with respect to the thickness direction (direction B) of the light diffusion control layer 11 by and angle "a."

The angle "a" can be expressed using vectors as follows. First, vector A is defined as a vector that is parallel to the extending direction (direction A) and directed from the surface side of the reflective display body 1 distal to the display surface toward the display surface side (in FIG. 3, from the lower side toward the upper side). Then, vector B is defined as a vector that is parallel to the thickness direction of the light diffusion control layer 11 and directed from the surface side of the reflective display body 1 distal to the display surface toward the display surface side (in FIG. 3, from the lower side toward the upper side). In this case, the angle "a" can be expressed as an angle between the vector A and the vector B. Basically, a "vector" used as a means for expressing the present invention has an important meaning in its direction. In this regard, unless otherwise stated, the term "vector" in the present specification shall be construed as having a vector quantity of arbitrary magnitude.

In the reflective display body 1 according to the present embodiment, the light diffusion control layer 11 satisfies the following condition regarding the relationship with the up-down direction of display content.

First, as illustrated in FIG. 3, vector C is defined as a vector obtained by projecting the vector A onto the display surface of the reflective display body 1.

Figure 4:
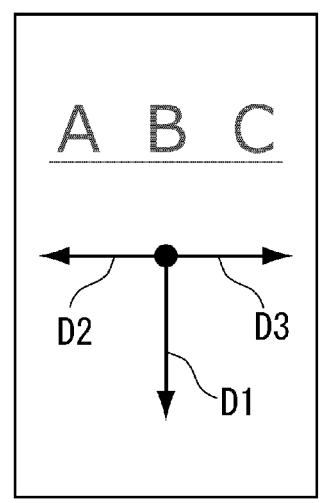
FIG. 4 is a plan view for describing some directions (vectors) of display content in the reflective display body according to an embodiment of the present invention.

On the other hand, as illustrated in FIG. 4, vector D1, vector D2, and vector D3 are assumed as follows. FIG. 4 illustrates a state in which the display surface of the reflective display body 1 according to the present embodiment is viewed in a plane. As illustrated in FIG. 4, the vector D1 is defined as a vector that has a starting point on the center of the display surface and is in the downward direction of an initial up-down direction of the display content. The vector D2 is defined as a vector that has a starting point on the center of the display surface and is in the leftward direction of an initial right-left direction of the display content. The vector D3 is defined as a vector that has a starting point on the center of the display surface and is in the rightward direction of the initial right-left direction of the display content. Here, the "initial up-down direction" and the "initial right-left direction" refer respectively to the up-down direction and the right-left direction as references when the reflective display body 1 according to the present embodiment is used. Usually, the up-down direction and the right-left direction as such references are selected based on primary up-down and right-left directions of display content (for example, up-down and right-left directions that are most adopted, up-down and right-left directions that coincide with the up-down and right-left directions of the operation unit of the display device, or the like).

Figure 5:
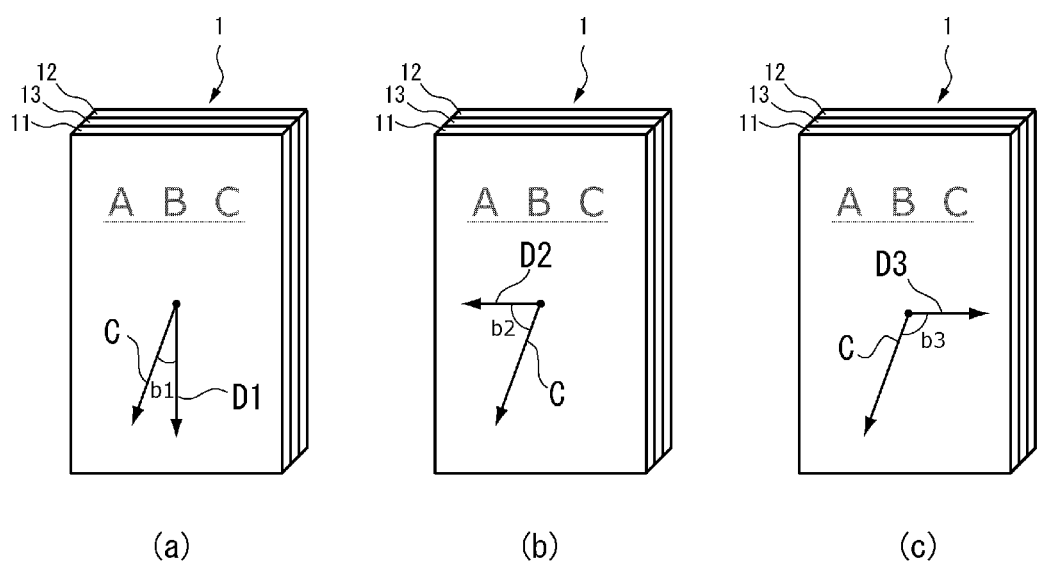
FIG. 5 is a set of perspective views for describing angles between vectors related to the light diffusion control layer and vectors related to the display content in the reflective display body according to an embodiment of the present invention.

In the reflective display body 1 according to the present embodiment, angles between the vectors C, the vector D1, the vector D2, and the vector D3 thus assumed satisfy the following condition. FIG. 5 depicts perspective views illustrating those angles. As illustrated in FIG. 5, in the reflective display body 1 according to the present embodiment, the smallest angle (which may be referred to as an "angle b," hereinafter) among an angle between the vector C and the vector D1 (angle denoted by "b1" in FIG. 5(*a*)), an angle between the vector C and the vector D2 (angle denoted by "b2" in FIG. 5(*b*)), and an angle between the vector C and the vector D3 (angle denoted by "b3" in FIG. 5(*c*)) is more than 0° and 45° or less.

Conventional reflective display bodies have been configured such that the vector C and the vector D1 in FIG. 5 are overlapped with each other (i.e., such that the vector C is directed to the lower part of the initial display content) from the viewpoint of maximizing the amount of light that is emitted from above the display body and reflected in the front direction of the display body. When such a display body is turned on its side, however, the light emitted from above the display body in that state cannot be sufficiently diffused in the front direction, thus resulting in a large difference in the brightness of the display content between when the display body is made to stand and when the display body is turned on its side.

In contrast, fortunately, in the reflective display body 1 according to the present embodiment, the above-described angle "b" is set to more than 0° and 45° or less as described above, and it is thereby possible to reduce the difference in the brightness of display content, for example, between when the display body is made to stand and when the display body is turned on its side, and excellent visibility can be achieved. From such a viewpoint, the above-described angle "b" may be preferably 10° or more and particularly preferably 35° or more. Additionally or alternatively, from the viewpoint of achieving a brighter display in the most-used direction, the above-described angle "b" may be preferably 45° or less and particularly preferably 40° or less.

In the reflective display body 1 according to the present embodiment, the previously described angle "a" may be preferably more than 0°, particularly preferably 2° or more, and further preferably 5° or more. The angle "a" within such a range allows the display content to be more brightly displayed. From another aspect, the above angle "a" may be preferably 30° or less, particularly preferably 15° or less, and further preferably 8° or less. The angle "a" within such a range allows the difference in the brightness to be more reduced when the up-down direction of the display content is changed. The above angle "a" can be measured by observing the cross section of the light diffusion control layer 11 using an optical digital microscope.

In the light diffusion control layer 11 of the present embodiment, when the regular internal structure is the above-described column structure and the regions 111 having a relatively high refractive index are the above-described columnar bodies, the columnar bodies may be bent between one ends and the other ends. In this case, the above-described extending direction (direction of the vector A) refers to an extending direction of the columnar bodies from the bending portions to one ends, in particular, from the bending portions to one ends on the viewer side.

The shape of the display surface of the reflective display body 1 according to the present embodiment is not particularly limited, but typically, the display surface may preferably have a rectangular shape. In this case, the display surface may be a rectangle composed of a pair of long sides and a pair of short sides or may also be a square whose all sides have the same length. When the display surface has such a rectangular shape, the display surface may be preferably configured such that the initial up-down direction of the display content is parallel to any one of the sides of the rectangle. Additionally or alternatively, the shape of the display surface may be a quadrangular shape other than a rectangular shape, such as a diamond shape, a trapezoidal shape, or a parallelogram, a circular shape such as a perfect circle or an ellipse, or an irregular shape other than these.

1. Configuration of Reflective Display Body (1) Light Diffusion Control Layer

The light diffusion control layer 11 in the present embodiment is not particularly limited, provided that it has a regular internal structure including the plurality of regions 111 having a relatively high refractive index in the region 112 having a relatively low refractive index, the regions 111 having a relatively high refractive index extend from one surface side to the other surface side of the light diffusion control layer 11, and the straight line parallel to the extending direction is tilted with respect to the thickness direction of the light diffusion control layer 11.

From the viewpoint of readily forming the regular internal structure as described above, the light diffusion control layer 11 according to the present embodiment may be preferably a layer obtained by curing a composition for light diffusion control layer that contains a high refractive index component and a low refractive index component having a refractive index lower than that of the high refractive index component. In particular, each of the high refractive index component and the low refractive index component may preferably have one or two polymerizable functional groups.

(1-1) High Refractive Index Component

Preferred examples of the above high refractive index component include (meth)acrylic ester that contains an aromatic ring, and (meth)acrylic ester that contains a plurality of aromatic rings may be particularly preferred. Examples of (meth)acrylic ester that contains a plurality of aromatic rings include those in which a part thereof is substituted with halogen, alkyl, alkoxy, alkyl halide, or the like, such as biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, and benzylphenyloxyalkyl (meth)acrylate. Among these, biphenyl (meth)acrylate may be preferred from the viewpoint of readily forming a good regular internal structure. Specifically, o-phenylphenoxyethyl acrylate, o-phenylphenoxyethoxyethyl acrylate, or the like may be preferred. In the present specification, (meth)acrylic acid means both the acrylic acid and the methacrylic acid. The same applies to other similar terms.

The molecular weight (weight-average molecular weight) of the high refractive index component may be preferably 2,500 or less, particularly preferably 1,500 or less, and further preferably 1,000 or less. From another aspect, the molecular weight (weight-average molecular weight) of the high refractive index component may be preferably 150 or more, particularly preferably 200 or more, and further preferably 250 or more. When the molecular weight (weight-average molecular weight) of the high refractive index component falls within the above range, the light diffusion control layer 11 having a desired regular internal structure can be readily formed. When the theoretical molecular weight of the above high refractive index component can be specified based on the molecular structure, the molecular weight (weight-average molecular weight) of the high refractive index component refers to the theoretical molecular weight (molecular weight that may not be the weight-average molecular weight). On the other hand, when it is difficult to specify the above-described theoretical molecular weight due to the above high refractive index component being a polymer component, for example, the molecular weight (weight-average molecular weight) of the high refractive index component refers to a weight-average molecular weight obtained as a standard polystyrene-equivalent value that is measured using a gel permeation chromatography (GPC) method. As used in the present specification, the weight-average molecular weight refers to a value that is measured as the standard polystyrene equivalent value using the GPC method.

The refractive index of the high refractive index component may be preferably 1.45 or more, more preferably 1.50 or more, particularly preferably 1.54 or more, and further preferably 1.56 or more. From another aspect, the refractive index of the high refractive index component may be preferably 1.70 or less, particularly preferably 1.65 or less, and further preferably 1.59 or less. When the refractive index of the high refractive index component falls within the above range, the light diffusion control layer 11 having a desired regular internal structure can be readily formed. As used in the present specification, the refractive index means the refractive index of a certain component before curing the composition for light diffusion control layer, and the refractive index is measured in accordance with JIS K0062: 1992.

The content of the high refractive index component in the composition for light diffusion control layer may be preferably 25 mass parts or more, particularly preferably 40 mass parts or more, and further preferably 50 mass parts or more with respect to 100 mass parts of the low refractive index component. From another aspect, the content of the high refractive index component in the composition for light diffusion control layer may be preferably 400 mass parts or less, particularly preferably 300 mass parts or less, and further preferably 200 mass parts or less with respect to 100 mass parts of the low refractive index component. When the content of the high refractive index component falls within such ranges, the regions derived from the high refractive index component and the region derived from the low refractive index component exist with a desired ratio in the regular internal structure of the light diffusion control layer 11 formed. As a result, the light diffusion control layer 11 having a desired regular internal structure can be readily formed.

(1-2) Low Refractive Index Component

Preferred examples of the above low refractive index component include urethane (meth)acrylate, a (meth)acrylic-based polymer having a (meth)acryloyl group in a side chain, a (meth)acryloyl group-containing silicone resin, and an unsaturated polyester resin, but it may be particularly preferred to use urethane (meth)acrylate.

The above urethane (meth)acrylate may be preferably formed of (a) a compound that contains at least two isocyanate groups, (b) polyalkylene glycol, and (c) hydroxyalkyl (meth)acrylate.

Preferred examples of the above-described (a) compound that contains at least two isocyanate groups include aromatic polyisocyanates such as 2,4-tolylene diisocyanate, 2,6-tolylene diisocyanate, 1,3-xylylene diisocyanate, and 1,4-xylylene diisocyanate, aliphatic polyisocyanates such as hexamethylene diisocyanate, alicyclic polyisocyanates such as isophorone diisocyanate (IPDI) and hydrogenated diphenylmethane diisocyanate, biuret bodies and isocyanurate bodies thereof, and adduct bodies (e.g., a xylylene diisocyanate-based trifunctional adduct body) that are reaction products with low molecular active hydrogen-containing compounds such as ethylene glycol, propylene glycol, neopentyl glycol, trimethylol propane, and castor oil. Among these, an alicyclic polyisocyanate may be preferred, and an alicyclic diisocyanate that contains only two isocyanate groups may be particularly preferred.

Preferred examples of the above-described (b) polyalkylene glycol include polyethylene glycol, polypropylene glycol, polybutylene glycol, and polyhexylene glycol, among which polypropylene glycol may be preferred.

The weight-average molecular weight of the (b) polyalkylene glycol may be preferably 2,300 or more, particularly preferably 3,000 or more, and further preferably 4,000 or more. From another aspect, the weight-average molecular weight of the (b) polyalkylene glycol may be preferably 19,500 or less, particularly preferably 14,300 or less, and further preferably 12,300 or less.

Preferred examples of the above-described (c) hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Synthesis of the urethane (meth)acrylate using the above-described components (a) to (c) as the materials can be performed in a commonly-used method. In such a method, from the viewpoint of efficiently synthesizing the urethane (meth)acrylate, the compounding ratio of the components (a), (b), and (c) as the molar ratio may be preferably a ratio of 1-5:1:1-5 and particularly preferably a ratio of 1-3:1:1-3.

The weight-average molecular weight of the low refractive index component may be preferably 3,000 or more, particularly preferably 5,000 or more, and further preferably 7,000 or more. From another aspect, the weight-average molecular weight of the low refractive index component may be preferably 20,000 or less, particularly preferably 15,000 or less, and further preferably 13,000 or less. When the weight-average molecular weight of the low refractive index component falls within the above range, the light diffusion control layer 11 having a desired regular internal structure can be readily formed.

The refractive index of the low refractive index component may be preferably 1.59 or less, more preferably 1.50 or less, particularly preferably 1.49 or less, and further preferably 1.48 or less. From another aspect, the refractive index of the low refractive index component may be preferably 1.30 or more, particularly preferably 1.40 or more, and particularly preferably 1.46 or more. When the refractive index of the low refractive index component falls within the above range, the light diffusion control layer 11 having a desired regular internal structure can be readily formed.

(1-3) Other Components

The previously described composition for light diffusion control layer may contain other additives in addition to the high refractive index component and the low refractive index component. Examples of other additives include a multifunctional monomer (compound having three or more polymerizable functional groups), a photopolymerization initiator, an antioxidant, an ultraviolet absorber, a light stabilizer, an antistatic, a polymerization accelerator, a polymerization inhibitor, an infrared absorber, a plasticizer, a diluting solvent, and a leveling agent.

The composition for light diffusion control layer may preferably contain a photopolymerization initiator among the above-described additives. When the composition for light diffusion control layer contains a photopolymerization initiator, the light diffusion control layer 11 having a desired regular internal structure can be readily and efficiently formed.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, benzophenone, p-phenylbenzophenone, 4,4-diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic ester, and oligo[2-hydroxy-2-methyl-1-[4-(1-methylvinyl)phenyl]propane]. These may each be used alone, or two or more types may also be used in combination.

When the photopolymerization initiator is used, the content of the photopolymerization initiator in the composition for light diffusion control layer may be preferably 0.2 mass parts or more, particularly preferably 0.5 mass parts or more, and further preferably 1 mass part or more with respect to 100 mass parts of the total amount of the high refractive index component and the low refractive index component. From another aspect, the content of the photopolymerization initiator may be preferably 20 mass parts or less, particularly preferably 15 mass parts or less, and further preferably 10 mass parts or less with respect to 100 mass parts of the total amount of the high refractive index component and the low refractive index component. When the content of the photopolymerization initiator in the composition for light diffusion control layer falls within the above range, the light diffusion control layer 11 can be readily and efficiently formed.

(1-4) Preparation of Composition for Light Diffusion Control Layer

The composition for light diffusion control layer can be prepared by uniformly mixing the previously described high refractive index component and low refractive index component and, if desired, other additives such as a photopolymerization initiator.

In the above mixing, a uniform composition for light diffusion control layer may be obtained by stirring it while heating it to a temperature of 40° C. to 80° C. A diluting solvent may be added and mixed so that the obtained composition for light diffusion control layer has a desired viscosity.

(1-5) Regular Internal Structure of Light Diffusion Control Layer

As previously described, the light diffusion control layer 11 in the present embodiment has a regular internal structure in its inside. The regular internal structure includes the plurality of regions 111 having a relatively high refractive index in the region 112 having a relatively low refractive index. In the light diffusion control layer 11, the regions 111 having a relatively high refractive index extend from one surface side toward the other surface side of the light diffusion control layer 11, and the straight line parallel to the extending direction of the regions 111 is tilted with respect to the thickness direction of the light diffusion control layer 11.

A more specific example of the above-described regular internal structure may be a column structure configured such that, as illustrated in FIG. 2, a plurality of columnar bodies as the regions 111 having a relatively high refractive index is densely arranged to stand in the film thickness direction in the region 112 having a relatively low refractive index. In the light diffusion control layer 11 in the present embodiment, it may be preferred to have a column structure as the regular internal structure from the viewpoint of readily achieving the excellent visibility. FIG. 2 depicts the columnar bodies as existing in the entire thickness direction in the light diffusion control layer 11, but the columnar bodies may not exist at least in one of the upper end part and lower end part of the light diffusion control layer 11 in the thickness direction.

When the light incident on the light diffusion control layer 11 having such a column structure falls within a predetermined incident angle range, the light exits the light diffusion control layer 11 while being strongly diffused with a predetermined opening angle. On the other hand, when the incident light is at an angle that falls outside the above incident angle range, the incident light transmits through the light diffusion control layer 11 without being diffused or exits the light diffusion control layer 11 with weaker diffusion than that in the case of the incident light within the incident angle range. When an image creating body is arranged parallel to the surface of the light diffusion control layer 11, the incident light within the above incident angle range is diffused due to the column structure, and the diffused light has a circular shape or an approximately circular shape (elliptical shape or the like) that spreads in any direction. On the other hand, in the case of the above weak diffusion due to the incident light outside the above incident angle range, the diffused light is in a crescent shape.

In the above column structure, the difference between the refractive index of the regions 111 (columnar bodies) having a relatively high refractive index and the refractive index of the region 112 having a relatively low refractive index may be preferably 0.01 or more, particularly preferably 0.05 or more, and further preferably 0.1 or more. When the above difference is 0.01 or more, effective diffusion can be performed. The upper limit of the above difference is not particularly limited and may be, for example, 0.3 or less.

Preferably, the above-described columnar bodies may have a structure in which the diameter increases from one surface to the other surface of the light diffusion control layer 11. The columnar bodies having such a structure may readily change the traveling direction of light parallel to the extending direction of the columnar bodies as compared with columnar bodies in which the diameter does not substantially change from one surface to the other surface. This allows the light diffusion control layer to effectively diffuse light.

The maximum value of the diameter in the cross sections when the columnar bodies are cut along a plane parallel to any one of the surfaces of the light diffusion control layer 11 may be preferably 0.1 µm or more, particularly preferably 0.5 µm or more, and further preferably 1 µm or more. From another aspect, the maximum value may be preferably 15 µm or less, particularly preferably 10 µm or less, and further preferably 5 µm or less. When the maximum value of the diameter falls within the above range, the light diffusion control layer 11 can effectively diffuse light. The shape of the above cross sections of the columnar bodies is not particularly limited, but may be preferably, for example, a circle, an ellipse, a polygonal shape, an irregular shape, or other similar shape.

In the above-described column structure, the distance between adjacent columnar bodies may be preferably 0.1 µm or more, particularly preferably 0.5 µm or more, and further preferably 1 µm or more. From another aspect, the above distance may be preferably 15 µm or less, particularly preferably 10 µm or less, and further preferably 5 µm or less. When the distance between adjacent columnar bodies falls within the above range, the light diffusion control layer can effectively diffuse light.

The dimensions and other parameters relating to the regular internal structure of the column structure described above can be measured by observing the cross section of the column structure using an optical digital microscope.

The regular internal structure of the light diffusion control layer 11 in the present embodiment may also be a structure obtained by modifying the above-described column structure. For example, the light diffusion control layer may have, as the internal structure, a structure in which the columnar bodies in the above-described column structure are bent at the middle in the thickness direction of the light diffusion control layer 11. Additionally or alternatively, the light diffusion control layer 11 may have a column structure with two or more regions of columnar bodies having different tilt angles in the thickness direction of the light diffusion control layer 11.

(1-6) Thickness of Light Diffusion Control Layer

The thickness of the light diffusion control layer 11 in the present embodiment may be preferably 30 µm or more, particularly preferably 60 µm or more, and further preferably 90 µm or more. From another aspect, the above thickness may be preferably 1,000 µm or less, particularly preferably 500 µm or less, and further preferably 200 µm or less. When the thickness of the light diffusion control layer 11 falls within such a range, brighter display can be readily achieved, and the difference in the brightness of display can be more reduced when the up-down direction of the display content is changed.

(2) Reflective Layer

The reflective layer 12 in the present embodiment is not particularly limited and may be any of reflective layers used for general reflective display bodies. Preferred examples of the reflective layer 12 include a metal vapor-deposited film obtained by vapor-depositing a metal on a given surface. Preferred examples of such a metal include aluminum, silver, and nickel.

The thickness of the reflective layer 12 made of the above-described metal vapor-deposited film is not particularly limited, but may be preferably, for example, 1 nm or more, particularly preferably 10 nm or more, and further preferably 50 nm or more. From another aspect, the above thickness may be preferably 3 µm or less, particularly preferably 1 µm or less, and further preferably 400 nm or less.

The reflective layer 12 made of the above-described metal vapor-deposited film may be provided on the surface of a resin film as a support body. Examples of such a resin film for use include polyethylene terephthalate films, polyethylene naphthalate films, polybutylene terephthalate films, polyethylene films, polypropylene films, polybutene films, polybutadiene films, polymethylpentene films, polyvinyl chloride films, vinyl chloride copolymer films, polyurethane films, ethylene vinyl acetate films, ionomer resin films, ethylene/(meth)acrylic acid copolymer films, ethylene/(meth)acrylic ester copolymer films, polystyrene films, polycarbonate films, polyimide films, fluorine resin films, and liquid crystal polymer films. Crosslinked films of these films may also be used. The resin film may also be a laminated film of these films.

The reflective layer 12 in the present embodiment may be a reflective electrode. The reflective electrode may be incorporated, for example, in a display device, which will be described later. In general, the reflective electrode is not provided to cover the entire display surface of the reflective display body 1, and there is a portion on which the electrode is not formed. In the reflective display body 1 including a reflective electrode, therefore, external light can be reflected by the reflective electrode, while on the other hand, light from a backlight or the like provided on the back surface of the display device can be transmitted through the portion on which the electrode is not formed. The material of the reflective electrode as the reflective layer 12 in the present embodiment is not particularly limited and can be formed of a general material for reflective electrodes.

In the reflective display body 1 illustrated in FIG. 1, the reflective layer 12 is drawn as a component independent of the display device 13 and is also drawn so as to exist in the entire area in the lateral direction (the entire area of the surface of the display device 13 opposite to the light diffusion control layer 11). However, the reflective display body 1 according to the present embodiment is not limited to the display body illustrated in FIG. 1 and encompasses a display body that includes the above-described reflective electrode as the reflective layer 12.

The reflective layer 12 in the present embodiment may also be a reflective layer having semi-transmissive and semi-reflective properties that exhibits both a property of transmitting light and a property of reflecting light.

(3) Display Device

The display device 13 in the present embodiment is not particularly limited and may be a display device incorporated in a general reflective display body. Examples of the display device 13 include liquid crystal displays, organic EL displays, electronic paper, electrophoresis displays, MEMS displays, and solid crystal displays, and the display device 13 may also be obtained by laminating a touch panel on any of these displays.

(4) Other Constitutional Members

The reflective display body 1 in the present embodiment may include one or more constitutional members other than the above-described light diffusion control layer 11, reflective layer 12, and display device 13.

For example, a front light may be provided on the surface side of the light diffusion control layer 11 opposite to the reflective layer 12 (and the display device 13) (i.e., on the surface side of the reflective display body 1 facing the viewer). An example of the front light may be preferably, but is not limited to, a front light comprising a light source and a light guiding member. The above light guiding member may be preferably provided so as to cover the surface side of the light diffusion control layer 11 opposite to the display device 13. Additionally or alternatively, the above light source may be preferably provided on at least a part of the peripheral part of the display surface and also provided so as to be in contact with the above light guiding member.

The above light guiding member is configured to introduce the light emitted from the light source to the display surface. The configuration of the light guiding member is not limited, provided that it exhibits such an action. For example, the light guiding member may be one provided with irregularities that constitute prisms inside the light guiding member or may also be one coated with a reflective material that contains particles reflecting light.

The position of the above light source is not limited, provided that the display surface can be irradiated with light via the light guiding member. For example, the light source may be provided at a position on the upper side (upper side for the viewer) of the peripheral part of the display surface. However, from the viewpoint of efficiently diffusing the light from the front light in the front direction, the light source may be preferably provided at a position at which, when the display surface is viewed in a plane, a straight line passing through the center of the light source and the center of the display surface is not parallel to any of the up-down direction and the right-left direction of the display content. This enables the display of a brighter image.

Regarding the position of the above light source, from the viewpoint of brightness, when the display surface is viewed in a plane, the angle between the straight line passing through the center of the light source and the center of the display surface and a straight line parallel to the up-down direction of the display content may be preferably more than 0° and less than 90°, more preferably 5° or more and 85° or less, particularly preferably 10° or more and 80° or less, and further preferably 15° or more and 75° or less.

Additionally or alternatively, regarding the position of the above light source, from the viewpoint of brightness, when the light diffusion control layer 11 is viewed in a plane, the angle between the straight line passing through the center of the light source and the center of the display surface and the previously described vector C may be preferably 30° or less, more preferably 20° or less, particularly preferably 10° or less, and further preferably 5° or less.

Examples of other constitutional members than the front light include a surface coat layer and a cover panel provided on the surface side of the light diffusion control layer 11 opposite to the reflective layer 12. Additionally or alternatively, a backlight may be provided on the surface side of the display device 13 opposite to the light diffusion control layer 11.

2. Method of Manufacturing Reflective Display Body

The method of manufacturing the reflective display body 1 is not particularly limited, and the reflective display body 1 can be manufactured using a conventional manufacturing method. For example, the reflective display body 1 can be obtained through manufacturing the light diffusion control layer 11, the display device 13, and the reflective layer 12 and then laminating them. The reflective display body 1 can also be obtained through manufacturing the display device 13 in which the reflective layer 12 is incorporated and then laminating the display device 13 on the light diffusion control layer 11 which is separately manufactured.

The method of manufacturing the light diffusion control layer 11 is not particularly limited, and the light diffusion control layer 11 can be formed using a conventionally known method. For example, one surface of a process sheet may be coated with the previously described composition for light diffusion control layer to form a coating film, and one surface of a release sheet (in particular, the release surface) is then attached to the surface of the coating film opposite to the process sheet. Subsequently, the above coating film is irradiated with active energy rays via the process sheet or the release sheet to cure the coating film, and the light diffusion control layer 11 can thereby be formed. Thus, by laminating the release sheet on the above coating film, the light diffusion control layer 11 having a uniform thickness can readily be formed while maintaining the gap between the release sheet and the process sheet and suppressing the crushing of the coating film.

Examples of the method for the above-described coating include a knife coating method, a roll coating method, a bar coating method, a blade coating method, a die coating method, and a gravure coating method. The composition for light diffusion control layer may be diluted using a solvent as necessary.

Irradiation of the coating film with the active energy rays may be performed in a different mode depending on the regular internal structure to be formed. Such irradiation can be performed using a conventionally known method. For example, when forming the previously described column structure, the coating film may be irradiated with parallel light having a high degree of parallelism of light rays.

The above active energy rays refer to electromagnetic wave or charged particle radiation having an energy quantum, and specific examples of the active energy rays include ultraviolet rays and electron rays. Among the active energy rays, ultraviolet rays may be particularly preferred because of easy management.

When forming the column structure using ultraviolet rays as the active energy rays, it may be preferred to set the irradiation condition such that the peak illuminance on the coating film surface is 0.1 to 10 mW/cm$^2$. The peak illuminance as referred to herein means a measured value at a portion at which the active energy rays irradiating the coating film surface give the maximum value. Additionally or alternatively, it may be preferred to set the integrated light amount on the coating film surface to 5 to 200 mJ/cm$^2$.

From the viewpoint of completing more reliable curing, it may also be preferred to perform the irradiation with commonly-used active energy rays (active energy rays for which the process of converting the rays into parallel light or strip-shaped light is not performed, scattered light) after performing the curing using the parallel light or strip-shaped light as previously described.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described further specifically with reference to examples etc., but the scope of the present invention is not limited to these examples etc.

<Production Example 1> (Light Diffusion Control Layer A)

(1) Preparation of Composition for Light Diffusion Control Layer

Polyether urethane methacrylate having a weight-average molecular weight of 9,900 was obtained as the low refractive index component by reacting polypropylene glycol, isophorone diisocyanate, and 2-hydroxyethyl methacrylate. A composition for light diffusion control layer was obtained through adding 60 mass parts (solid content equivalent value, here and hereinafter) of o-phenylphenoxyethoxyethyl acrylate having a molecular weight of 268 as the high refractive index component and 8 mass parts of 2-hydroxy-2-methyl-1-phenylpropan-1-one as the photopolymerization initiator to 40 mass parts of the above low refractive index component and then heating and mixing them under a condition of 80° C.

(2) Formation of Light Diffusion Control Layer

One surface of a long polyethylene terephthalate sheet as the process sheet was coated with the obtained composition for light diffusion control layer to form a coating film. Subsequently, the release surface of a release sheet (available from LINTEC Corporation, product name "SP-PET381130," thickness: 38 μm) obtained by release-treating one surface of a polyethylene terephthalate with a silicone-based release agent was laminated on the surface of the coating film opposite to the process sheet.

The laminate thus obtained and composed of the release sheet, the above coating film, and the process sheet was placed on a conveyor. At that time, the surface of the laminate on the release sheet side was on the upper side, and the longitudinal direction of the laminate was made parallel to the flow direction of the conveyor. Then, an ultraviolet spot parallel light source (available from JATEC) having a controlled center beam parallelism within ±3° was installed on the conveyor on which the laminate was placed. At that time, the light source was installed so as to be able to emit parallel light in a direction tilted by 5° in the flow direction of the conveyor with respect to the normal direction of the surface of the laminate on the coating film side.

Thereafter, while the conveyor was operated to move the laminate, the coating film in the laminate was cured by being irradiated with parallel light having a parallelism of 2° or less (UV light from a high-pressure mercury lamp having a main peak at a wavelength of 365 nm and other peaks at 254 nm, 303 nm, and 313 nm) under the conditions of a peak illuminance of 2.00 mW/cm$^2$ and an integrated light amount of 53.13 mJ/cm$^2$ on the coating film surface, and a light diffusion control layer A having a thickness of 110 μm was thus formed. As a result, a laminate was obtained in which the process sheet, the light diffusion control layer A (thickness: 110 μm), and the release sheet were laminated in this order.

When the cross section of the formed light diffusion control layer A was observed with a microscope and the like, it was confirmed that a column structure in which a plurality of columnar bodies was densely arranged to stand in the entire thickness direction was formed in the light diffusion control layer A. That is, the ratio of the column structure region extending in the thickness direction inside the obtained light diffusion control layer A was 100%. It was also confirmed that the angle (angle "a" in FIG. 3) between the extending direction of the above-described columnar bodies (direction A in FIG. 3) and the thickness direction (direction B in FIG. 3) of the light diffusion control layer A was 3.3°. In the present specification, the angle is indicated as a positive value when the direction A is tilted in the conveyor traveling direction with respect to the direction B, while the angle is indicated as a negative value when the direction A is tilted in the opposite direction to the conveyor traveling direction.

The above-described peak illuminance and integrated light amount were measured using a UV METER (available from EYE GRAPHICS CO., LTD., product name "EYE Ultraviolet Integrated Illuminance Meter UVPF-A1") equipped with a light receiver and installed for the position of the above coating film. The thickness of the light diffusion control layer A was measured using a constant-pressure thickness meter (available from TAKARA SEISAKUSYO, product name "Teclock PG-02J").

<Production Example 2> (Light Diffusion Control Layer B)

A laminate in which the process sheet, a light diffusion control layer B (thickness: 110 μm), and the release sheet were laminated in this order was obtained in the same manner as in Production Example 1 except that the ultraviolet spot parallel light source (available from JATEC) was installed so that the light source would be able to emit parallel light in a direction tilted by 10° in the flow direction of the conveyor with respect to the normal direction of the surface of the laminate on the coating film side.

When the cross section of the formed light diffusion control layer B was observed with a microscope and the like, it was confirmed that a column structure in which a plurality of columnar bodies was densely arranged to stand in the entire thickness direction was formed in the light diffusion control layer B. That is, the ratio of the column structure region extending in the thickness direction inside the obtained light diffusion control layer B was 100%. It was also confirmed that when the angle "a" of the light diffusion control layer B was measured in the same manner as for the light diffusion control layer A, it was 6.6°.

Example 1

The process sheet and the release sheet were released and removed from the laminate produced in Production Example 2, and the light diffusion control layer B was obtained. Then, the surface of the light diffusion control layer B opposite to the surface irradiated with ultraviolet rays was laminated on the reflective surface of a rectangular reflective layer having long sides and short sides (the reflective layer was obtained by vapor-depositing aluminum on the surface of a polyethylene terephthalate film having a thickness of 100 μm so that the thickness of the aluminum would be 300 nm). A reflective display body sample was thus obtained.

In the obtained reflective display body sample, it was assumed that the surface on the light diffusion control layer side was the display surface. It was also assumed that the direction of the long sides of the above reflective layer coincided with the initial up-down direction of the display content and the direction of the short sides of the above reflective layer coincided with the initial right-left direction of the display content.

In the above-described lamination, the reflective display body sample was obtained by performing the lamination so that the angle (corresponding to the angle "b1" in FIG. 5) would be 15° between a vector (vector C in FIG. 3) obtained by projecting a vector parallel to the extending direction of the columnar bodies of the light diffusion control layer B onto one surface of the light diffusion control layer B and an arbitrary-size vector (vector D1 in FIG. 4) having the starting point on the center of the above display surface and directed downward in the above-described initial up-down direction.

Through the above-described lamination, the angle "b2" between the vector C and the vector D2 illustrated in FIG. 5 is 75°, and the angle "b3" between the vector C and the vector D3 illustrated in FIG. 5 is 105°. As a result, in the obtained reflective display body sample, the smallest angle (angle "b") among the angles "b1" to "b3" is 15°.

Example 2

A reflective display body sample was obtained in the same manner as in Example 1 except that the lamination was performed so that the angle "b" would be 30°.

Example 3

A reflective display body sample was obtained in the same manner as in Example 1 except that the lamination was performed so that the angle "b" would be 45°.

Example 4

A reflective display body sample was obtained in the same manner as in Example 1 except that the light diffusion control layer A was used and the lamination was performed so that the angle "b" would be 45°.

Comparative Example 1

A reflective display body sample was obtained in the same manner as in Example 1 except that the lamination was performed so that the angle "b" would be 0°.

<Testing Example 1> (Measurement of Diffusion Angle Region of Light Diffusion Control Layer)

For each of the light diffusion control layers A and B produced respectively in Production Examples 1 and 2, a diffusion angle region with a haze value of 90% or more was measured using a variable haze meter (available from Toyo Seiki Seisaku-sho, Ltd., product name "Haze-Gard-Plus, Variable Haze Meter").

Specifically, in a single body of the light diffusion control layer obtained by releasing and removing the process sheet and the release sheet from the laminate obtained in each of Production Examples 1 and 2, the surface opposite to the surface irradiated with ultraviolet rays during the manufacturing was attached to one surface of an alkali-free glass plate (thickness: 1.1 mm) to obtain a laminate. Then, the laminate was installed so that the distance from the integrating sphere aperture in the above variable haze meter to the arrival position of the measurement light would be 62 mm and the alkali-free glass side would face the light source. Then, a change in the haze value (%) was measured by rotating the longitudinal direction of the light diffusion control layer (transport direction during the production) with the width direction of the light diffusion control layer at the above arrival position as a rotation axis. That is, only the tilt angle of the light diffusion control layer was changed thereby to vary the incident angle of the measurement light with respect to the light diffusion control layer, and the haze value (%) was measured at each incident angle. Provided that the incident angle of the measurement light in the normal direction of the laminate was 0° and the rotational direction in which the traveling direction side in the longitudinal direction of the light diffusion control layer (transport direction during the production) approached the light source gave a positive angle, the measurement was performed in a range of –70° to 70°. Details of the measurement conditions were as follows.

Light source: C light source
Measuring diameter: φ18 mm
Diameter of integrating sphere aperture: φ25.4 mm
Then, an angle region with the measured haze value (%) of 90% or more was specified as the diffusion angle range. The results are listed in Table 1.

<Testing Example 2> (Measurement of Reflectance)

For each of the reflective display body samples produced in Examples and Comparative Example, the reflectance was measured using a variable-angle color meter (available from Suga Test Instruments Co., Ltd., product name "Variable-angle color meter VC-2").

Specifically, first, the standard reflective plate attached to the variable-angle color meter was irradiated with light rays from the C light source so that the angle between the light rays and the normal direction of the reflective surface of the standard reflective plate would be 30°, and the amount of light rays reflected in the front direction of the standard reflective plate (direction perpendicular to the reflective surface) was measured and used as a reference value.

Subsequently, the surface of each reflective display body sample on the light diffusion control layer side (surface assumed to be the display surface) was irradiated with light rays from the C light source so that the angle between the light rays and the normal direction of that surface would be 30°, and the amount of light rays reflected in the front direction of the reflective display body sample (direction perpendicular to that surface) was measured. At that time, the measurement was performed for the following two cases: a case (down orientation) in which the light rays were emitted from the upper side in the primary up-down direction of the display content on the reflective display body sample (as previously described, the up-down direction is parallel to the direction of the long sides of the reflective layer); and a case (right orientation) in which the light rays were emitted from the right side. Then, the ratios of the amounts of reflected light rays in the down orientation and the right orientation thus measured to the above reference value were calculated, and these were used as the values of reflectance (%). The results are listed in Table 2.

Furthermore, the average value (%) of the reflectance in the down orientation and the reflectance in the right orientation obtained as above was calculated and used as the brightness. The results are listed in Table 2. In addition, the difference in brightness (%) between the case of the down orientation and the case of the right orientation was calculated based on the following equation (1). The results are also listed in Table 2.

Difference in brightness (%)=(Absolute value of difference between reflectance in down orientation and reflectance in right orientation)/(Sum of reflectance in down orientation and reflectance in right orientation)×100     (1)

TABLE 1

| | Angle (angle "a") (°) between extending direction of columnar bodies and thickness direction of light diffusion control layer | Diffusion angle region (°) |
|---|---|---|
| Light diffusion control layer A | 3.3 | −38.75~11.11 |
| Light diffusion control layer B | 6.6 | −43.00~4.75 |

TABLE 2

| | Type of light diffusion control layer | Angle "b" (°) | Reflectance (%) | | Brightness (%) | Difference in brightness (%) |
|---|---|---|---|---|---|---|
| | | | Right orientation | Down orientation | | |
| Example 1 | B | 15 | 127.82 | 286.07 | 206.95 | 38.24 |
| Example 2 | B | 30 | 158.25 | 252.60 | 205.43 | 22.96 |
| Example 3 | B | 45 | 191.73 | 200.86 | 196.30 | 2.33 |
| Example 4 | A | 45 | 106.52 | 106.52 | 106.52 | 0.00 |
| Comparative Example 1 | B | 0 | 121.73 | 295.20 | 208.47 | 41.61 |

As listed in Table 2, in the reflective display body samples according to Examples, the difference in brightness between the case of emitting light rays in the down orientation and the case of emitting light rays in the right orientation was able to be suppressed as compared with the reflective display body sample according to Comparative Example. That is, it has been found that the reflective display body samples according to Examples are less likely to cause the difference in brightness even when the up-down direction of the display content is changed, and excellent visibility can be achieved.

It has also been found that the reflected light from the reflective display body samples according to Examples 1 to 3 can have sufficient brightness. Also from this point, it has been found that the reflective display body samples according to Examples 1 to 3 can achieve excellent visibility.

INDUSTRIAL APPLICABILITY

The reflective display body of the present invention is suitably used for manufacturing an information terminal, such as a smartphone or a tablet, which is configured such that the up-down direction of the display content can be changed.

DESCRIPTION OF REFERENCE NUMERALS

1 Reflective display body
11 Light diffusion control layer
111 Regions (columnar bodies) having a relatively high refractive index
112 Region having a relatively low refractive index
12 Reflective layer
13 Display device

The invention claimed is:

1. A reflective display body configured such that an up-down direction of display content on a display surface can be changed, the reflective display body comprising:
a light diffusion control layer having a regular internal structure, the regular internal structure comprising a plurality of regions having a relatively high refractive index in a region having a relatively low refractive index; and
a reflective layer provided on a surface side of the light diffusion control layer opposite to the display surface,
wherein in the light diffusion control layer, the regions having the relatively high refractive index extend from one surface side toward another surface side of the light diffusion control layer, and a straight line parallel to an extending direction of the regions is tilted with respect to a thickness direction of the light diffusion control layer,
wherein when vectors A, C, D1, D2, and D3 are defined as follows:
the vector A is parallel to the extending direction and directed from a surface side of the reflective display body distal to the display surface toward the display surface side;
the vector C is obtained by projecting the vector A onto the display surface;
the vector D1 has a starting point on a center of the display surface and is in a downward direction of an initial up-down direction of the display content;
the vector D2 has a starting point on the center of the display surface and is in a leftward direction of an initial right-left direction of the display content; and
the vector D3 has a starting point on the center of the display surface and is in a rightward direction of the initial right-left direction of the display content,
a smallest angle among an angle between the vector C and the vector D1, an angle between the vector C and the vector D2, and an angle between the vector C and the vector D3 is more than 0° and 45° or less.

2. The reflective display body according to claim 1, wherein when a vector B is defined as a vector that is parallel to the thickness direction of the light diffusion control layer and directed from the surface side of the reflective display body distal to the display surface toward the display surface side, an angle between the vector A and the vector B is more than 0° and 30° or less.

3. The reflective display body according to claim 2, wherein
the display surface has a rectangular shape, and
the reflective display body is configured such that the initial up-down direction of the display content is parallel to any one of sides of the rectangular shape.

4. The reflective display body according to any one of claim 3, wherein
the reflective display body comprises a front light provided on a surface side of the light diffusion control layer opposite to the reflective layer,
the front light comprises: a light guiding member that covers the display surface; and a light source that is in contact with the light guiding member and positioned on at least a part of a peripheral part of the display surface, and
the light source is present at a position at which, when the display surface is viewed in a plane, a straight line passing through a center of the light source and the center of the display surface is not parallel to any of the up-down direction and the right-left direction of the display content.

5. The reflective display body according to any one of claim 2, wherein
the reflective display body comprises a front light provided on a surface side of the light diffusion control layer opposite to the reflective layer,
the front light comprises: a light guiding member that covers the display surface; and a light source that is in contact with the light guiding member and positioned on at least a part of a peripheral part of the display surface, and
the light source is present at a position at which, when the display surface is viewed in a plane, a straight line passing through a center of the light source and the center of the display surface is not parallel to any of the up-down direction and the right-left direction of the display content.

6. The reflective display body according to claim 1, wherein
the display surface has a rectangular shape, and
the reflective display body is configured such that the initial up-down direction of the display content is parallel to any one of sides of the rectangular shape.

7. The reflective display body according to any one of claim 6, wherein
the reflective display body comprises a front light provided on a surface side of the light diffusion control layer opposite to the reflective layer,
the front light comprises: a light guiding member that covers the display surface; and a light source that is in contact with the light guiding member and positioned on at least a part of a peripheral part of the display surface, and
the light source is present at a position at which, when the display surface is viewed in a plane, a straight line passing through a center of the light source and the center of the display surface is not parallel to any of the up-down direction and the right-left direction of the display content.

8. The reflective display body according to claim 1, wherein
the reflective display body comprises a front light provided on a surface side of the light diffusion control layer opposite to the reflective layer,
the front light comprises: a light guiding member that covers the display surface; and a light source that is in contact with the light guiding member and positioned on at least a part of a peripheral part of the display surface, and
the light source is present at a position at which, when the display surface is viewed in a plane, a straight line passing through a center of the light source and the center of the display surface is not parallel to any of the up-down direction and the right-left direction of the display content.

* * * * *